United States Patent
Neis et al.

[11] Patent Number: 6,005,056
[45] Date of Patent: Dec. 21, 1999

[54] MODIFIED ACRYL COPOLYMER

[75] Inventors: Stephan Neis, Pulheim; Matthias Masonne, Köln, both of Germany

[73] Assignee: Bollig & Kemper KG, Germany

[21] Appl. No.: 08/913,142

[22] PCT Filed: Mar. 6, 1996

[86] PCT No.: PCT/DE96/00393

§ 371 Date: Nov. 3, 1997

§ 102(e) Date: Nov. 3, 1997

[87] PCT Pub. No.: WO96/28478

PCT Pub. Date: Sep. 19, 1996

[30] Foreign Application Priority Data

Mar. 10, 1995 [DE] Germany ............ 195 08 544

[51] Int. Cl.[6] ..................................... C08F 8/14
[52] U.S. Cl. ........................ 525/327.3; 525/386
[58] Field of Search ................. 525/327.3, 386

[56] References Cited

U.S. PATENT DOCUMENTS

| | | | |
|---|---|---|---|
| 2,857,354 | 10/1958 | Fang | 260/33.2 |
| 3,752,870 | 8/1973 | Labana | 260/836 |
| 3,939,128 | 2/1976 | Behrens | 525/327.3 |
| 4,011,381 | 3/1977 | Iwasawa et al. | 525/327.3 |
| 4,051,194 | 9/1977 | Ishikawa et al. | 525/327.3 |
| 4,839,448 | 6/1989 | Jung et al. | 526/262 |
| 4,883,838 | 11/1989 | Jung et al. | 525/119 |
| 5,100,966 | 3/1992 | Maters et al. | 525/286 |
| 5,116,892 | 5/1992 | Barbee et al. | 525/327.3 |
| 5,177,152 | 1/1993 | Maters et al. | 525/286 |
| 5,364,910 | 11/1994 | Takinishi et al. | 525/327.3 |
| 5,492,955 | 2/1996 | Wamprecht et al. | 525/375 |

FOREIGN PATENT DOCUMENTS

| | | |
|---|---|---|
| 0355892 | 2/1990 | European Pat. Off. . |
| 0652263 | 5/1995 | European Pat. Off. . |
| 2247146 | 4/1973 | Germany . |
| 7303541 | 1/1973 | Japan . |
| 793776 | 4/1954 | United Kingdom . |
| 1399159 | 6/1975 | United Kingdom . |
| 8702041 | 4/1987 | WIPO . |

*Primary Examiner*—Bernard Lipman
*Attorney, Agent, or Firm*—Vorys Sater Seymour and Pease LLP

[57] ABSTRACT

A modified acrylic copolymer obtained by modifying an epoxy groups-containing copolymer by a carboxyl group-containing polycycloaliphatic substance having at least two cycles and a refractive index at 20° C. of at least 1.460 as well as the use for lacquers with higher gloss.

41 Claims, No Drawings

MODIFIED ACRYL COPOLYMER

SPECIFICATION

The invention relates to a modified acrylic copolymer and its use for lacquers with increased gloss.

The principal objective of the manufacturers of lacquers is a decorative attractive high gloss lacquer which simultaneously protects the substrate being coated. These requirements are particularly demanding in the motorcar industry. So far, the increase of gloss has been achieved by adding gloss additives or also leveling additives. However, these additives are disadvantageous in that they exude and thus, considerably impair the repainting characteristics as a result of a loss of adhesiveness. Moreover, these conventional lacquers gave poor results in humidity condensation tests.

Object of the present invention is to provide an acrylic copolymer modified in such a manner to allow its use, for example, for the production of coating compositions which, as compared to corresponding coating compositions made of unmodified acrylic copolymers, are characterized by higher gloss and higher resistance to chemicals as well as a weathering resistance adapted to the requirements set on clear coats in the motorcar industry.

Coating compositions of the kind are used in particular as clear coats in the motorcar industry.

This problem is solved by the invention by an acrylic copolymer obtained by modifying an epoxy groups-containing copolymer by a carboxylic group-containing polycycloaliphatic substance having at least two cycles, in particular at least three cycles and a refractive index at 20° C. of at least 1.460.

A carboxyl group-containing polycycloaliphatic compound according to the present invention is a substance or a compound having a polycarbocyclic structure or partial structure, i.e. the cycles are only carbocycles.

Particularly suitable polycycloiliphatic compounds can be tricycloaliphatic monocarboxylic acids selected from the group of hydrogenated acids of natural resins, e.g. commercial products such as "Foral AX-E" of the Hercules BV company; adamantane carboxylic acids and tricyclic monocarboxylic acids derived from dicyclopentadiene, such as, e.g. tricyclodecane derivatives having a carboxyl group (TCD carboxylic acids), in particular tricyclo[$5.2.1.0.^{2,6}$]-clecane-8-carboxylic acid, preferably tetrahydroabietic acid.

In respect of the interrelation between refractive index and gloss, it is referred to the article of Juergen H. Braun in JOURNAL OF COATINGS TECHNOLOGY, Vol. 63, No. 799, August 1991.

In connection with the interrelation between refractive index and temperature, it is referred to Organikum, author collective, VEB Deutscher Verlag der Wissenschaften, 16th edition, Berlin 1986, pages 76 et seq.

For substances that are not liquid at 20° C., the refractive index can be determined at elevated temperature by means of a thermo regulated Abbé refractometer with the light of the sodium D-line $\lambda=589$ nm. The following applies as increment for the temperature correction: addition of $5\times10^{-4}$ units per ° C.

In a further embodiment of the invention, the mol ratio of carboxylic group to epoxy group is between 0.5 to 1.0, preferably between 0.8 and 1.0.

The modified aciylic copolymers can be obtained by reacting an epoxy groups-containing acrylic copolymer, having more than one epoxy group per average molecular weight with the claimed modifying agents at elevated temperature, e.g. from 60 to 200° C., preferably from 120 to 170° C. The reaction can be conducted in the melt or in the presence of organic solvents, such as usually used in the manufacture of paints or resins, e.g. alcohols, e.g., methoxypropanol, butanol, aromatic hydrocarbons, e.g. xylol, crude oil distillates comprising mainly alkylbenzenes, esters, e.g. butyl acetate, methoxypropyl acetate, ketones, e.g. butanonc, methylisobutyl ketone, and mixtures thereof. If desired, conventional catalysts can likewise be used for the catalysis of the epoxy/carboxy reaction, e.g. alkali metal hydroxides, e.g. lithium hydroxide monohydrate, tertiary amines, e.g. triethylamine, N,N-benzylmethylamine, triethylbenzyl ammonium chloride, benzyltrimethyl ammonium hydroxide, also mixtures of different catalysts, in general in an amount of from 0.1 to 2% by weight, based on the total amount of the components. If the reactions are conducted at elevated temperature, e.g. from 150 to 170° C., the use of catalysts can generally be dispensed with. The claimed modifying agents can be added to the epoxy groups-containing acrylic copolymer already before the reaction temperature or progressively, portion by portion, during the reaction temperature or continuously by taking the exothermic reaction into consideration, also in the form of solutions, e.g., in organic solvents, as far as they are soluble or dispersible therein. The amount of the claimed modifying agents is selected, as already specified above, such that the ratio of epoxy groups to carboxyl groups is from 1:0.5 to 1:1 and depends primarily on the purpose of application or use of the clear coat. In general, the reaction is terminated as soon as the acid number has fallen below 20 and is preferably from 0 to 10; however, also modified acrylic copolymers having a higher acid number, e.g. from 25 to 50 can be produced.

The preferably used non-aqueous and solvent dilutable clear coats of the present invention contain a modified acrylic copolymer which is produced by the reaction of an epoxy groups-containing acrylic copolymer having more than one epoxy group per average molecular weight, preferably having an epoxy value of from 0.1 to 0.5, with the claimed modifying agents at temperatures of above 60° C., the ratio of the carboxyl group to epoxy groups being preferably from 0.5:1 to 1:1, in particular from 0.8:1 to 1:1.

The average molecular weight of the modified acrylic copolymers may vary within broad limits and is preferably from 1,000 to 10,000, in particular from 1,500 to 5,000. The hydroxyl content is from 1 to 10% by weight, preferably from 2 to 5% by weight. The acid number is below 50, preferably below 20, and is in particular from 0 to 10. The modified acrylic copolymers can also contain free epoxy groups since the ratio of carboxyl group to epoxy groups is from 0.5:1 to 1:1 in the preparation of the modified acrylic copolymer.

A preferred embodiment of the invention is a modified acrylic copolymer, the mol ratio of carboxyl group to epoxy group being between 0.8 and 1.0, preferably between 0.9 and 1.0.

Thus, according to a further embodiment of the invention, this acrylic copolymer can be further reacted at elevated temperature with polycarboxylic acids and/or their anhydrides to yield semiesters.

This reaction product, i.e. the product of modified acrylic polymer and polycarboxylic acids or their anhydrides, can have an acid number sufficient to make the reaction product water dilutable after neutralization.

The specified water dilutable reaction product can be obtained, for example, by neutralization with bases, preferably tertiary amines.

In the aqueous clear coats of the present invention which contain the modified acrylic copolymer, the ratio of carboxyl group to epoxy groups in the preparation of the modified acrylic copolymers is preferably from 0.8:1 to 1:1, in particular from 0.9:1 to 1:1, and the acid number is from 15 to 50, in particular from 25 to 40. However, the process is preferably conducted in such a manner that the modified acrylic copolymer having an acid number of below 20, in particular of from 0 to 10, is reacted subsequently after the preparation with polycarboxylic anhydrides, e.g. maleic anhydride, hexahydrophthalic anhydride, tetrahydrophthalic anhydride, trimellithic anhydride, to form semiesters without loss of water at elevated temperature, e.g. from 60 to 160° C., so that an acid number results which is sufficient to make this additionally modified acrylic copolymer water dilutable, after neutralization with bases, preferably tertiary amines, e.g. dimethylaminoethanol, preferably at an acid number of from 25 to 40.

Aqueous clear coats, the latter contain a modified acrylic copolymer the preparation of which requires solvent-free epoxy groups-containing acrylic copolymers or epoxy grotips-containing acrylic copolymers prepared by solution polymerization as starting material, water-miscible solvents or solvents that form an azeotrope with water being preferably used which, after the reaction of the epoxy groups-containing acrylic copolymers with the claimed modifying agents and, if desired, subsequent reaction with polycarboxylic anhydrides and complete or partial neutralization with bases, preferably tertiary amines, as well as dilution with water, can be completely or partially removed from the cycle in a conventional manner, preferably by vacuum distillation.

A thusly modified acrylic polymer can primarily be used for the manufacture of water borne clear coats, preferably in the motorcar industry.

In a particular embodiment of the present invention, the carboxyl group-containing polycycloaliphatic substance can have a refractive index at 20° C. of at least 1.480.

The carboxyl group-containing polycycloaliphatic substance can, for example, also be a reaction product of at least two compounds, at least one of which being a polycycloaliphatic compound having a refractive index of at least 1.480.

In particular, at least one of the polycycloaliphatic compounds, having a refractive index at 20° C. of at least 1.460 or 1.480, can be present in the carboxyl group-containing reaction product in an amount of at least 10% by weight, preferably of at least 20% by weight, in particular of at least 50% by weight.

In a further embodiment of the invention, the carboxyl group-containing polycycloaliphatic substance can be a reaction product of one or a mixture of alcohols with at least one dicarboxylic acid and/or its anhydrides, neither the alcohol nor the dicarboxylic acid or its anhydride being a polycycloaliphatic compound.

If the alcohol is the polycycloaliphatic compound, for example a tricycloaliphatic monoalcohol selected from the group consisting of perhydrogenated natural resins such as perhydroabietyl alcohol; dicyclopentadiene derivates, such as the TCD alcohols 8-hydroxytricyclo[5.2.1.0$^{2,6}$]decan, 8-hydroxymethyltricyclo[5.2.1.0$^{2,6}$]decan (commercial product TCD alcohol M of the Hoechst AG), 8-hydroxytricyclo[5.2.1.0$^{2,6}$]dec-3-en, 9 hydioxytiicyclo [5.2.1.0$^{2,6}$]dec-3-en, then the dicarboxylic acid or its anhydride(s) can be selected from the group consisting of succinic acid(anhydride), glutaric acid(anhydride), quinolinedicarboxylic acid(anhydride), furandicarboxylic acid (anhydride), pyridinedicarboxylic acid(anhydride), phthalic acid(anhydride), hexahydrophthalic acid(anhydride), tetrahydrophthalic acid(anhydride), methylhexahydrophthalic acid(anhydride), naphthalenedicarboxylic acid(anhydride) and maleic acid(anhydride). The designation "anhydride" denotes here and in the following that both the free acid and its anhydride are meant thereby. If the dicarboxylic acid or its anhydride, as the starting material for the reaction product, is the polycycloaliphatic compound, the alcohol can also be an aliphatic monohydric alcohol, e.g. methanol, ethanol, n-propanol, isopropanol, methoxypropanol, n-butanol, isobutanol, 2-ethyl-1-hexanol, 1-hexanol, a heptyl alcohol, a nonyl alcohol, a fatty alcohol, e.g. octanol, decanol, dodecanol, a glycol monoether, e.g. methyl glycol, ethyl glycol, butyl glycol, polyglycol monoether, an aromatic monohydric alcohol, e.g. benzyl alcohol; or a cycloaliphatic monohydric alcohol, e.g. cyclohexanol, cyclododecanol, cyclopentanol.

The reaction product is preferably a semiester of phthalic acid(anhydride), hexahydrophthalic acid(anhydride) or methylhexahydrophthalic acid(anhydride) and tricyclic monohydric alcohols, e.g. of the type designated above as hydroabietyl alcohol.

The carboxyl group-containing polycycloaliphatic substance can additionally contain one or a mixture of aromatic compounds, preferably from the group of aromatic monocarhoxylic acids, such as naphthoic acid, benzenemonocarboxylic acids, such as benzoic acid, o-toluic acid, m-toluic acid, p-toluic acid, hydroxybenzoic acid, ter.butylbenzoic acid; aromatic heterocyclic monocarhoxylic acids, such as pyridine carboxylic acids, furan carboxylic acids.

If high requirements are set on the weathering resistance of the acrylic polymer or the coating compositions prepared therefrom, aromatic or heterocyclic monocarboxylic acids are not used therewith or the total amount of aromatic rings, including vinyl aromatic compounds such as styrene, does not exceed 30% by weight, based on the modified acrylic copolymer.

Epoxy groups-containing acrylic copolymers which can be used for the purposes of the invention are described in a mixture of patents, for example, in EP-A-212 457, DE-OS 39 24 618, EP-A-150 963, EP-A-351 966, or DE-OS 40 27 742.

In a preferred embodiment of the invention, the epoxy groups-containing copolymer is obtained by polymerization of one or a mixture of compounds containing at least one epoxy group and at least one ethylenic unsaturated group with one or a mixture of other monomers.

The compound containing at least one epoxy group and at least one ethylenic unsaturated group can be, for example, an allylgycidyl ether or glycidyl(meth)acrylate.

The designation (meth) in (meth)acryl- means here and in the following that both the methacrylic as well as the acrylic compounds are embraced thereby.

The other monomer(s) can be, for example, alkyl(meth) acrylate(s), styrene, vinyltoluene, polypropylene glycol mono(meth)acrylate, hydroxyalkyl(meth)acrylate(s) and/or hydroxyl-containing reaction products of hydroxyalkyl (meth)acrylates with lactones, such as ε-caprolactone.

Epoxy groups-containing acrylic copolymers having an epoxy value of from 0.1 to 0.5 per average molecular weight, preferably from 1000 to 10 000, in particular from 1500 to 5000, determined by gel permeation chromatography, are preferably used as starting material.

To prepare an acrylic copolymer of the present invention, preferably by solution polymerisation, one can use from 15 to 75% by weight monoolefinic monoglycidyl compounds, e.g. allylglycidyl ether, glycidylacrylate, preferably glycidylmethacrylate, from 25 to 82% by weight copolymerizaible carboxyl groups-free α,β-ethylenic unsaturated monomers, if desired containing one hydroxyl group, and from (0 to 3% by weight copolymerizable carboxyl groups-containing α,β-ethylenic unsaturated monomers, the sum of all components being always 100% by weight. To prepare the epoxy groups-containing acrylic copolymers, one can preferably use from 20 to 50% by weight glycidyl(meth) acrylate, from 0 to 30% by weight styrene and/or vinyltoluene, from 5 to 25% by weight hydroxyalkyl(meth) acrylate, e.g. hydroxyethyl(meth)acrylate, hydroxypropyl (meth)acrylate, hydroxybutyl(meth)acrylate, polypropylene glycol monomethacrylate, hydroxyl groups-containing reaction products of hydroxyalkyl(meth)acrylates, e.g. hydroxyethylacrylate with lactones, e.g. ε-caprolactone, and from 25 to 40% by weight (meth)acrylic ester, e.g. methylmethacrylate, butyl(meth)acrylate, 2-ethylhexyl (meth)acrylate, cyclohexylmethacrylate, furfurylmethacrylate, lauryl(meth)acrylate, stearyl(meth) acrylate, trimethylcyclohexylmethacrylate, tetracyclododecyl- 3-acrylate, the sum of all components being always 100% by weight. If desired, one can also use therewith vinylesters, e.g. vinylacetate, vinylpropionate, "VeoVa 10" (Shell) and/or reaction products of "Cardura E 10" (Shell) with acrylic acid, e.g. prepared according to DE-PS 28 58 781, in minor amounts of, e.g. up to 30% by weight, based on the total amount of the other monomers.

If desired, the modified acrylic copolymer of the present invention can additionally contain the additives and adjuvants conventionally used for the preparation of lacquers, for example, surfactants, e.g. cross-linking agents and leveling agents based on silicon, e.g. polyether-modified dimethylpolysiloxane copolymers, fluorosurfactants;

rheology agents, e.g. antirun-off agents (SCA-modified acrylic copolymers; SCA=Sagging Control Agents);

thickeners or thixotropic agents, highly dispersible silicic acid, polyurethanes, highly viscous acrylic copolymers with acrylic and/or methacrylic acid as mainly effective copolymerized component; acid catalysts, e.g. aromatic sulfonic acids, e.g. p-toluene-sulfonic acid, dinonyl-naphthalene disulfonic acid, dodecylbenzene sulfonic acid, which may also be blocked, for example by tertiary amines, e.g. morpholine, phosphoric acid, acidic phosphoric acid partial esters and monohydric or dihydric alcohols, e.g. phosphoric acid monobutylester, semiester of dicarboxylic acids or their anhydrides and monohydric alcohols, e.g. maleic acid monobutyl ester, solutions of polyacids in organic suitable solvents, e.g. 20%-solutions of maleic acid in methoxypropanol;

accelerators, e.g. tertiary amines, e.g. triethylamine, dibutyl tin dioxide, dibutyl tin dilaurate, metal alcoholates, e.g. aluminum isopropylate, butyltitanate, metal chelates of aluminum, zirconium or titanium, e.g. titanylacetylacetonate;

UV absorbers, e.g. benztriazole derivatives and HALS compounds (HALS—Hindered Amine Light Stabilizer);

polymerization initiators, preferably of the kind that are first effective at higher temperatures, e.g. 100° C. or higher, e.g. ditert.butylperoxide, tertiary butylperbenzoate;

solvents (organic solvents, water);

cross-linking agents, in particular carboxyfunctional components, preferably polycarboxylic acids or their anhydrides, e.g. itaconic acid, methyl malcic anhydride, dodecanedioic acid, 2-dodecenedioic acid, dodeccnylsuccinic anhydride, phthalic anhydride, tetrahydrophthalic anhydride, trimellithic anhydride, 1,2-, 1,3- and 1,4-cyclolhexanedicarboxylic acid, hexahydrophthalic anhydride or mixtures thereof as conventionally used for curing polyepoxides, e.g. diepoxides derived from bisphenol-A, cycloaliphatic diepoxicles, e.g. hexahydrophthalic acid diglycidyl ester, 3,4-epoxycyclohexylmethyl-3',4'-epoxycyclohexanecarboxylate, epoxy groups-containing acrylic copolymers having more than one, preferably two or more epoxy groups per average molecular weight; or also polyacids which are semiesters formed by reaction of a polyol, e.g. 1.6-hexanecliol, trimethylolpropane and an acid anhydride, e.g. hexahydrophthalic anhydride, methylhexahydrophthalic anhydride, as described for example in EP-A-212 457; and acrylic copolymers having carboxy functional groups, e.g. prepared by using considerable amounts of (meth)acrylic acid in the preparation of acrylic copolymers, e.g. having an acid number of 70 or higher, as well as anhydride-acrylic copolymers, e.g. prepared by the use of maleic anhydride and/or itaconic acid in tie preparation of acrylic copolymers, as described, for example, in EP-A-358 306, EP-A-966, EP-A-316 873, as well as carboxyl groups-coritaining unsaturated or saturated polyester, in particular with higher acid number, e.g. 70 or higher; and/or amino resins which are absolutely compatible with the modified acrylic copolymers in respect of lacquering techniques, preferably amino resins fully or partially etlerified with monohydric alcohols, in particular C1–C4 alcohols, e.g. urea- and/or triazine-formaldehyde resins, in particular melamine-formaldehyde resins, benzoguanamine resins, e.g, tetramethoxybenzoguanamine, triazine-formaldehyde resins, prepared according to DE-OS 42 37 515, e.g., by reacting 2,4-diamino-6-diethylaminotriazine, paraformaldehyde and butanol, hexamethoxymethlylmelamine, hexamethylbutoxymethylmelamine, tetramethoxymethylglycoluril; in particular carboxyl groups-containing derivatives of fully or partially etherified amino resins, as described, for example, in DE-OS 35 37 855, U.S. Pat. No. 3,519,627, U.S. Pat. No. 3,502,557 and U.S. Pat. No. 4,026,855; or the amino resins mentioned in the pertinent literature (Karsten, Lackrohstofftabellen, 9th edition, published by Curt R. Vincentz, Hannover 1922, pages 269–288, European Resin Directory 1993, European Resin Mitnufacturers Association, p. 101–108); and or lacquer polyisocyanates having free or partially or fully blocked NCO groups, preferably polyisocyanates, containing in particular 3 free, partially or fully blocked NCO groups, e.g. lacquer polyisocyanates comprising mainly toluoene diisocyanate, hexamethylene diisocyanate or isophoronediisocyanate or 3(4)-isocyanatomethyl-1-methyl-cyclohexylisocyanate, e.g. their trimerizition products having an isocyanurate structure or their modifying products having a uretdione or biuret structure in their molecules or prepolymers having free NCO groups, e.g. reaction products of polyols, e.g. trimethylolpropane with diisocyanates; polyisocyanates containing partly or preferably completely blocked NCO groups, e.g. by using conventional blocking agents, or mixtures thereof, e.g. malonic acid diethyl ester, ethyl acetoacetate, butanone oxime and/or caprolactam; the two components-polyurethane lacquers described in WO-93/05090, also high solid baked clear coats which contain as cross-linking agents preferably a mixture of lacquer polyisocyanates based on isophoronediisocyanate and hexamethylenediisocyanate; the baked clear coats for multi-layer lacquering described in DE-OS 42 04 518, these clear coats containing hydroxyl groups-containing synthetic resins and a mixture of amino resins and mixtures of polyisocyanates blocked by different blocking agents;

additional monocarboxylic acids, preferably saturated monocarboxylic acids having at least 7 carbon atoms, in particular saturated unbranched fatty acids, e.g. pelargonic acid, undecanoic acid, palmitic acid, stearic acid, lauric acid, coconut oil fatty acid, palm kernel oil fatty acid, 2-ethylhexanoic acid. To achieve special effects, e.g. leveling improvement, increase of chemical and water resistance, these fatty acids may also contain one or a mixture of fluorine atoms as further substituents, e.g. pentadecafluorooctanoic acid (perfluorooctanoic acid, commercial produce Fluorad acid F 26 of the 3M Deutschland GmbH)

further binding agent components, preferably resins which are absolutely compatible in respect of lacquering techniques with the modified acrylic copolymers and cross-linking agents, in particular carboxyl groups- and hydroxyl groups-containing acrylic copolymers and/or carboxyl groups- and hydroxyl groups-containing saturated or unsaturated polyester in minor amounts (1 to 30% by weight), based on modified acrylic copolymer.

Non-aqueous clear coats comprising the acrylic polymers of the present invention, that have been suitably adapted to said non-aqueous lacquers, contain as cross-linking agent preferably fully or partially etherifield melamine-formaldehyde resins, in particular melamine-formaldehyde resins etherified with methanol, and/or ethanol and/or n-propanol, and/or isopropanol and/or n-butanol and/or isobutanol, for example hexamethoxymethylmelamine, methoxymethylethoxymethylmelamine, methoxymethlbutoxymethylmelamine, methoxymethylmelamine, methoxymethylisobutoxymethylmelamine, and/or carboxyl groups-containing derivatives of fully or partially etherified amino resins, preferably carcoxyl groups-containing derivatives of hexamethoxymethylmelamine with polycarboxylic acids or their anhydrides of the kind described above, if desired, in mixture with lacquer polyisocyanates, preferably comprising mainly hexamethylenediisocyanate and/or isophorone diisocyanate, the NCO groups of which being fully blocked so that good storable one component glazing lacquers result. The clear coats of the present invention can, of course, contain as cross-linking agents only lacquer polyisocyanates having free NCO groups, preferably based on hexamethylenediisocyanate and/or isophorone diisocyanate if they are intended to be used as two components-polyurethane lacquers, if desired, by adding minor amounts of melamine-formaldehyde resins for the cold curing at room temperature or minority elevated temperatures, e.g. 60° C., or as two components-baked enamels.

These non-aqueous or solvent dilutable clear coats contain the solvents usually used in the solution polymerization of acrylic copolymers and in the preparation of baking enamels, e.g. aromatic hydrocarbons, e.g. xylol, ester, e.g. methoxypropylacetate, ketones, e.g. butanone, methylisobutylketone, alcohols, e.g. butanol, methoxypropanol, glycolmonoether, e.g. butyl glycol or mixtures thereof, e.g. mixtures of mainly aromatic crude oil distillate solvents having an elevated boiling point and butanol, and can be diluted with these solvents or solvent blends to the viscosity necessary for application. The solids content of these clear coats in the condition in which they are technically applied, e.g. at spray viscosity, is preferably at least 45%, in particular 50% by weight and higher.

They can generally be applied by spray painting techniques, e.g. pneumatic, hot or airless spraying or by electrostatic painting techniques, e.g. by means of high speed rotating minibells, electrostatic automatic or manual spray guns with air support or by roll coating, e.g. according to the coil coating method.

Non-aqueous and solvent dilutable clear coats of the present invention can also be available as non-aqueous dispersion in organic solvents (NAD); for example, the manufacture of the NADs can be conducted by selecting suitable solvent combinations and/or by incorporation of cross-linked polymer microparticles (microgels), e.g. manufactured by emulsion polymerization of acrylic monomers by using therewith acrylic monomers having a mixture of unsaturated groups, e.g. hexanecdioldiacrylate, trimethylolpropanetriacrylate, if desired, by using dispersion stabilizers based on hydroxystearic acid and acrylic monomers.

Aqueous clear coats comprising the acrylic copolymers of the present invention, modified and adapted to aqueous lacquers, contain as cross-linking agents preferably fully or partially etherified amino resins and/or carboxyl groups-containing derivatives of hexamethoxumethylmelamine, as already described above in connection with the use in non-aqueous clear coats, however, with the limitation that only such amino resins are present which in combination with modified water dilutable acrylic copolymers, if desired by adding so-called co-solvents, e.g. butanol, methoxypropanol, butyl glycol and mixtures thereof, become water dilutable or are water dilutalble right from the beginning, e.g. methoxymethylmethyolmelamine, and/or blocked polyisocyanates which are water dilutable by a modification with hydrophilic groups and/or by the incorporation of carboxyl groups, e.g. by the use of dimethylolpropionic acid during their preparation, for example, commercial products of the Bayer company; or aqueous clear coats to be used according to the invention contain emulsified therein when they are to be applied as two component-system, low viscosity lacquer polyisocyanates having free NCO groups, preferably trimerized hexamethylenediisocyanate or hydrophilic adapted polyisocyanates of the kind.

These clear coats contain as solvent, if desired, relatively minor amounts of co-solvents, e.g. water miscible solvents, e.g. butyl glycol, butinol, methoxypropanol or mixtures thereof, preferably in an amount of below 10% by weight, in particular below 5% by weight, based on the technical application of the clear coats, while the main solvent is water and, of course, contain also the neutralizing agents, e.g. tertiary amines, preferably dimethylaminoethanol. The solids content of these clear coats in the technically applicable form is, e.g. at spray viscosity, preferably at least 30% by weight, in particular at least 35% by weight.

In a further embodiment of the invention, the modified acrylic copolymer of the present invention can be used in a powder coating. The powder clear coats contain in particular a modified acrylic copolymer which is a solid resin at room temperature, for example with a glass transition temperature (Tg) of 30° C. or higher or softening points of from 40 to 150° C., and can be processed in a conventional manner according to the prior art to yield a powder clear coat.

These powder clear coats can contain a modified acrylic copolymer by the preparation of which one starts preferably from solvent-free epoxy groups-containing acrylic copolymers, e.g. commercial products such as "PD 7610 Resin" of Mitsui Toatsu. The solvent free state of epoxy groups-containing acrylic copolymers can be achieved according to the prior art by bulk polymerization or by removing the solvents from an epoxy groups-containing acrylic copolymer prepared by solution polymerization after the preparation of the same, e.g. by vacuum distillation. It is, of course, also possible to react an epoxy groups-containing acrylic copolymer, prepared by solution polymerization, in solution with the claimed modifying agents to recover a modified acrylic copolymer and to subsequently remove the solvents, e.g. by vacuum distillation. It is expedient to use solvents having relatively low boiling points, e.g. between 80 and 140° C. In these powder clear coats, the ratio of epoxy groups to carboxyl groups depends on the kind and amount of cross-linking agents, e.g. carboxy-functional components, pulverized amino resins, blocked polyisocyanates, or their mixtures, additionally contained in the clear coat.

Powder clear coats of the kind contain as cross-linking agents preferably aliphatic dicarboxylic acids such as dodecanedioic acid (cf. WO 94/05714) and cycloaliphatic dicarboxylic acids, such as 1,2-, 1,3- and/or 1,4-cyclohexanedioic acid and/or hexahydrophthalic anhydride, preferably mixtures of 1,4-cyclohexanedicarboxylic acid and hexahydrophthalic anhydride, and/or in particular carboxylic groups-containing saturated and/or unsaturated polyesters which are solid resins at room temperature, e.g. having a softening point of from 60 to 110° C. and high acid number, e.g. 70 or higher, preferably unsaturated polyesters exhibiting these properties and prepared by reacting a dicarboxylic acid component comprising 1,4-cyclohexanedicarboxylic acid and/or hexahydrophthalic anhydride and/or isophthalic acid, a diol component comprising neopentyl glycol and/or hydroxypivalic acid neopentyl glycol ester and/or cyclohexanedimethanol as well as unsaturated diols of monoallyl ethers of trihydric alcohols, preferably trimethylolpropanemonoallyl ether, in an amount of from 10–30% by weight, based on the total sum of all components under the process conditions conventionally observed in the preparation of unsaturated polyesters and in such a manner that at first an unsaturated polyester having hydroxyl groups is prepared, preferably with a hydroxyl content of from 3 to 10% by weight which is then subsequently reacted, for example with polycarboxyliic anhydrides, preferably maleic amhydride, citraconic anhydride, hexahydrophthalic anhydride, tetrahydrophthalic anhydride, trimellithic anhydride, to yield a semiester and that without or with only minor loss of water at relatively low temperatures, e.g. from 60 to 160° C. and/or powder coating-cross-linking agents comprising mainly blocked polyisocyanates, in particular based on mainly hexamethylene diisocyanate and/or isophorone diisocyanate and conventional blocking agents or mixtures thereof, e.g. butanone oxime, malonic acid diethylester, ethyl acetoacetate, caprolactam, and/or pulverized amino resins, in particular at room temperature waxy hexamethoxymethylmelamine, tetramethoxybenzoguanamine and/or tetramethoxymethylglycoluril.

The powder clear coats contain in particular as cross-linking agents powder-coating-cross-linking agents comprising mainly 3(4)-isocyanatomethyl-1-methyl-cyclohexylisocyanate, as described, e.g. in Farbe and Lack, Vol. 5, May 1994, published by Curt R. Vincentz Verlag Hannover, pages 330–335 and the NCO groups of which are not blocked. Pulverized clear coats used according to the invention are applied according to the powder coating methods with electrostatic automatic or manual spray guns. Powder clear coats containing the modified acrylic copolymer of the present invention are baked at the baking conditions conventionally observed for powder clear coats (temperature between 130 and 200° C., duration between 20 and 30 min.).

The acrylic copolymer cab be used according to the invention as coating composition, in particular in the motor-car industry.

In a preferred embodiment of the invention, the acrylic copolymer is used in a water-based clear coat, in particular in the motorcar industry. Clear coats of the kind contain from 50 to 90% by weight, preferably from 60 to 80% by weight, cross-linking agents, based on the binder.

In the non-aqueous or solvent dilutable or aqueous clear coats, which contain the acrylic copolymer modified according to the invention, the baking temperatures can be in general between 80° C. and 240° C. for a period of from about 30 to 60 minutes.

Non-aqueous or aqueous clear coats which contain as hardener mainly polyisocyanates having free NCO groups are able to cure as two component-systems already at room temperature; however, they can also be subjected to a heat drying, i.e. baked at temperatures between 40 ad 160° C.

In particular, the modifier acrylic copolymer of the present invention can be used in a multilayer coating obtained by applying a pigmented base coat and forming a base layer and applying a clear coat in a "wet in wet process", containing the claimed acrylic copolymer, and jointly curing the two lacquers.

A multilayer coating of the kind is particularly suitable for the motorcar series finishing lacquering, in particular two layer metallic finishing lacquering. It can also be used for the car repair lacquering, in particular for the motorcar series finishing lacquer repair, for the two wheels-multilayer lacquering, multilayer lacquering of electric appliances or machines, for multilayer coating of plastic materials, in particular of motorcar plastic parts as well as for the coil coating method.

In general the application of the clear coat containing the acrylic polymer of the present invention is effected in such a manner to yield a dry film layer thickness of from 20 to 60 $\mu$m of the clear coat coating.

An essential property of the modified acrylic copolymer or of a clear coat or corresponding multilayer top coat prepared from said modified acrylic copolymer is that after being cured on pigmented base coats as substrates, they form films of high gloss as compared to analogously prepared acrylic copolymers obtained by modifying an epoxy groups-containing copolymer by a carboxyl group-containing substance having a refractive index at 20° C. of less than 1.440.

The gloss determination was conducted according to the DIN standards 67539, ISO 2813 and ASTM D 523 with a Haze Gloss measuring instrument of the Byk-Gardner company at a measuring angle of 20°.

A further essential property of the modified acrylic copolymer or of a clear coat or corresponding multilayer top coat prepared from this modified acrylic copolymer is that the coating compositions manufactured therefrom have good stone impact and chemical resistance, in particular vis a vis acid reagents, good solvent resistance, e.g. vis a vis fuel, a high degree of hardness and good elasticity as well as excellent weathering resistance. Thus, they are considerably superior to comparable multilayer lacquerings in the preparation of which clear coats comprising conventional acrylic copolymers are used.

The following examples serve for illustrating the invention.

Preparation of an Epoxy Groups-containing Acrylic Copolymer (preliminary step)

410 g Solvesso 100 (higher alkylated aromatic compounds with a boiling range of from 162 to 175° C., Esso Chemie) and 7.8 g cumolhydroperoxide are placed in a 4-necked flask provided with KPG stirrer, reflux condenser, dropping funnel and thermoelement and heated to 160° C. A monomer blend comprising 57 g butylmethacrylate, 177 g styrene, 177 g glycidylmethacrylate, 212 g 2-ethylhexylacrylate and 85 g hydroxypropylacrylate as well as 21.5 g tert.butylperoctoate and 18 g solvesso 100 is added thereto drop by drop within a period of 4 hours. After termination of the addition, the mixture is subsequently stirred for 1 hour and is thereafter allowed to postpolymerize by adding thereto 2.4 g tert.butylperoctoate and 3.6 g Solvesso 100 within a period of 30 minutes. The mixture is allowed to react further for 2 hours at 160° C. and is subsequently cooled. The remaining epoxy groups-containing acrylic copolymer solution has a solids content of 63% by weight and a viscosity of 15 seconds at 20° C. in a DIN standard cup No. 4 after dilution to 45% by weight with Solvesso 100.

EXAMPLE 1 (comparison)

Modification with a carboxylic acid having a refractive index <1.440

562 g of the epoxy groups-containing acrylic copolymer solution designated as preliminary step are reacted with 123 g stearic acid at 160° C. up to an acid number of 5. After cooling, dilution with 100 g Solvesso 100 is conducted and one recovers a modified epoxyacrylate solution having a solids content of 60% by weight and a viscosity of 16 seconds at 20° C. in a DIN standard cup Nr. 4 after dilution to 45% by weight with Solvesso 100.

EXAMPLE 2

562 g of the epoxy groups-containing acrylic copolymer solution designated as preliminary step are reacted with 277 g of a 66%-solution of the semiester in Solvesso 100, prepared from hexahydrophthalic anhydride and TCD-Alcohol-M (Hoechst AG), at 160° C. up to an acid number of 5. After cooling, dilution with 50 g Solvesso 100 is conducted and one recovers a modified epoxyacrylate solution having a solids content of 62% by weight and a viscosity of 17 seconds at 20° C. in a DIN standard cup No. 4 after dilution to 45% by weight with Solvesso 100.

EXAMPLE 3 (clear coat comparative example)

Clear coat consisting of acrylic copolymer according to comparative example 1

40.2 parts by weight of the acrylic copolymer prepared according to Example 1 (solids content 60% by weight in Solvesso 100) are blended with 26.5 parts by weight of a commercial methanol/n-butanol mixed-etherified melamine resin (85% by weight solved in n-butanol). Thereafter, 12 parts by weight of a commercial SCA-modified (Sagging Control Agent) acrylic copolymer (60% by weight in Solvesso 100/butylacetate 2:1) are incorporated therein. 1.0 parts by weight of benzotriazol-based UV absorber and 0.5 parts by weight of a HALS compound are subsequently added followed by the addition of 2.5 parts by weight of a commercial phosphoric acid catalyst (4% by weight in n-butanol) and 1.0 parts by weight of a 10%-solution of a leveling agent in n-butanol, comprising mainly polysiloxane. By adding 15 parts by weight xylol, a spray viscosity of 55 seconds in Ford beaker at 20° C. is adjusted.

EXAMPLE 4 (clear coat)

39 parts by weight of a modified acrylic copolymer (solids content 62% by weight) according to example 2 are mixed with 26.5 parts by weight of a commercial methanol/n-butanol mixed-etherified melamine resin (85% by weight solved in n-butanol). 12 parts by weight of a commercial SCA-modified (Sagging Control Agent) acrylate copolyiner (60% by weight in Solvesso100/butylacetate 2:1) are incorporated to the blend. Thereafter, the blend is reacted with 0.1 part benzotiiazol-based UV absorber, and 0.05 parts by weight of a HALS compound. 2.5 parts by weight of a commercial phosphoric acid catalyst (4 parts by weight in n-butanol) and 1.0 part by weight of a 10%-leveling agent in n-butanol, comprising mainly polysiloxane, are subsequently added. A spray viscosity of 55 seconds in Ford beaker at 20° C. is adlusted by adding 15 parts by weight xylol.

PREPARATION OF THE TEST SHEETS

The substrates usually used in the motorcar industry for the application of clear coats are conventional zink phosphated sheet metal with E-coat and primer coating. A conventional aqueous metallic base coat (color shade mallard-green, FORD XSC-No. 2683 SCM) is applied thereon having a dry film thickness of from 10 to 15 µm and is provided with a 40 to 50 µm clear coat layer after 10 minutes predrying at 80° C. Baking for 30 minutes at 150° C. follows thereupon.

Gloss Determination with a Haze/Gloss Measuring Instrument at a Measuring Angle of 20° C.:

clear coat comparative example 3: 89.0 clear coat example 4: 94.0

Determination of the Chemical Resistance in a Gradient Furnace:

| Temperature ° C. | 30 | | 35 | | 40 | | 45 | | 50 | |
|---|---|---|---|---|---|---|---|---|---|---|
| Lacquer of example | 4 | 3 | 4 | 3 | 4 | 3 | 4 | 3 | 4 | 3 |
| dist. water | 4 | 4 | 4 | 4 | 4 | 4 | 4 | 4 | 4 | 4 |
| 0.5N HCl | 4 | 4 | 4 | 4 | 4 | 4 | 4 | 3 | 3 | 3 |
| 2.5N HCl | 4 | 3 | 4 | 3 | 4 | 2 | 3 | 2 | 3 | 2 |
| 5N HCl | 4 | 2 | 4 | 2 | 3 | 2 | 3 | 2 | 2 | 2 |
| VW solut.[1] | 4 | 4 | 4 | 4 | 4 | 4 | 4 | 4 | 3 | 2 |
| 0.5% by weight $H_3PO_4$ | 4 | 4 | 4 | 4 | 4 | 4 | 4 | 2 | 4 | 2 |
| 0.1% by weight $HNO_3$ | 4 | 4 | 4 | 4 | 4 | 4 | 4 | 3 | 3 | 3 |
| pancreatin[2] | 4 | 3 | 4 | 3 | 4 | 3 | 4 | 3 | 4 | 3 |
| Ford US Solut.[3] | 3 | 2 | 3 | 2 | 2 | 2 | 2 | 1 | 1 | 1 |

[1]10%-iron(III) sulfate Solution
[2]as approximately 50%-solution in water
[3]mixture of 47% by weight formic acid, 24% by weight tannic acid (10% by weight in water), 24% by weight honey and 5% by weight albumin (10% by weight in water)

The evaluation of the properties takes place according to a points system with the following significance:

4: in order

3: lightly swollen

2: swollen

1: lacquer damaged
0: lacquer chipped off

We claim:

1. An acrylic copolymer obtained by modifying an epoxy groups-containing acrylic copolymer by reacting said epoxy groups-containing copolymer with a carboxyl group-containing polycycloaliphatic substance having at least two rings and a refractive index at 20° C. of at least 1.460.

2. An acrylic copolymer of claim 1 characterized in that the carboxyl group-containing polycyloaliphatic substance has at least 3 rings.

3. An acrylic copolymer of claim 1 characterized in that the mol ratio of carboxyl group to epoxy group is from 0.5 to 1.0.

4. An acrylic copolymer according to claim 1 characterized in that the mol ratio of carboxyl group to epoxy group is from 0.9 to 1.0.

5. An acrylic copolymer of claim 4, characterized in that said acrylic copolymer is further reacted at elevated temperature with at least one polycarboxylic acid or anhydride thereof to form a semiester.

6. An acrylic copolymer of claim 5, characterized in that the reaction product of the acrylic copolymer and the least one polycarboxylic acid or anhydride thereof has an acid number sufficient to make the reaction product water dilutable after neutralization.

7. An acrylic copolymer of claim 6, characterized in that the water dilutable reaction product is obtained by neutralization with a base.

8. An acrylic copolymer of claim 1 characterized in that the carboxyl group-containing substance has a refractive index at 20° C. of at least 1.480.

9. An acrylic copolymer of claim 1 characterized in that the carboxyl group-containing polycycloaliphatic substance is a reaction product of at least two compounds, at least one of said compounds being a polycycloaliphatic compound having a refractive index at 20° C. of at least 1.460.

10. An acrylic copolymer of claim 9, characterized in that said at least one polycycloaliphatic compound has a refractive index at 20° C. of at least 1.480 and is present in an amount of at least 10% by weight in the carboxyl group-containing polycycloaliphatic reaction product.

11. An acrylic copolymer of claim 9, characterized in that the carboxyl group-containing polycycloaliphatic substance is a reaction product of at least one alcohol with at least one dicarboxylic acid or its anhydride.

12. An acrylic copolymer of claim 11, characterized in that the dicarboxylic acid or its anhydride is selected from the group consisting of phthalic acid, hexahydrophthalic acid, tetrahydrophthalic acid, methylhexahydrophthalic acid, 1,8-naphthalene dicarboxylic acid and maleic acid and anhydrides thereof.

13. An acrylic copolymer according to claim 1 characterized in that the carboxyl group-containing polycycloaliphatic substance additionally contains at least one aromatic compound.

14. An acrylic compound of claim 13, characterized in that the aromatic compound is an aromatic monocarboxylic acid.

15. An acrylic polymer of claim 1, characterized in that the epoxy groups-containing copolymer is obtained by polymerization of at least one compound containing at least one epoxy group and at least one ethylenic unsaturated grouping with at least one different monomer.

16. An acrylic copolymer of claim 15 characterized in that the compound containing at least one epoxy group and at least one ethylenic unsaturated grouping is an allylglycidyl ether or glycidyl(meth)acrylate.

17. An acrylic copolymer of claim 15, characterized in that the different monomer is selected from the group consisting of alkyl(meth)acrylates, styrene, vinyltoluene, propyleneglycolmono(meth)acrylate, hydroxyalkyl(meth) acrylates and hydroxyl-containing reaction products of hydroxyalkyl(meth)acrylates with lactones.

18. An acrylic copolymer of claim 1 characterized in that it additionally contains at least one auxiliary material selected from the group consisting of surfactants, rheology adjuvants, thickeners, thixotropic agents, accelerators, light stabilizers, polymerization initiators, cross-linking agents, monocarboxylic acids and further binders.

19. An acrylic copolymer of claim 1 characterized in that the polycycloaliphatic carboxyl group-containing substance is a tricycloaliphatic monocarboxylic acid selected from the group consisting of hydrogenated natural resins, adamantane carboxylic acid, and tricyclomonocarboxylic acids derived from dicyclopentadiene.

20. An acrylic copolymer of claim 19, characterized in that said tricyclomonocarboxylic acid derived from dicyclopentadiene is tricyclo[$5.2.1.0^{2,6}$]decane-8-carboxylic acid.

21. An acrylic copolymer of claim 19, characterized in that said tricyclomonocarboxylic acid derived from dicyclopentadiene is tetrahydroabietic acid.

22. An acrylic copolymer of claim 11 characterized in that the alcohol is a tricycloaliphatic monoalcohol selected from the group consisting of perhydrogenated natural resins and dicyclopentadiene derivatives.

23. An acrylic copolymer of claim 22 characterized in that said perhydrogenated natural resin is perhydroabietyl alcohol.

24. An acrylic copolymer of claim 22 characterized in that said dicylopentadiene derivative is selected from the group consisting of 8-hydroxytricyclo[$5.2.1.0^{2,6}$]decane, 8-hydroxymethyltricyclo[$5.2.1.0^{2,6}$]decane, 8-hydroxytricyclo-[$5.2.1.0^{2,6}$]dec-3-ene, and 9-hydroxytricyclo[$5.2.1.0^{2,6}$]dec-3-ene.

25. A coating composition comprising the acrylic copolymer of claim 1.

26. The coating composition of claim 25, characterized in that said coating composition is a powder coating composition.

27. The coating composition of claim 25, characterized in that said coating composition is a clear coat.

28. The coating composition of claim 25, characterized in that said coating composition is an aqueous clear coat.

29. The coating composition of claim 25, characterized in that said coating composition is a finishing lacquer.

30. A method for preparing a multilayer cured lacquer coating on a substrate comprising the steps of
   1) applying a pigmented base layer and forming a basecoat;
   2) prior to curing said basecoat, applying a clear coat containing an acrylic copolymer of claim 1; and
   3) jointly curing the two lacquers.

31. An acrylic copolymer of claim 3 characterized in that the mol ratio of carboxyl group to epoxy group is from 0.8 to 1.0.

32. An acrylic copolymer of claim 7, characterized in that said base is a tertiary amine.

33. An acrylic copolymer of claim 9, characterized in that said polycycloaliphatic compound has a refractive index of at least 1.480.

34. An acrylic copolymer of claim 10, characterized in that said polycycloaliphatic compound which has a refractive index at 20° C. of at least 1.480 is present in an amount of at least 20% by weight in the carboxyl group-containing polycycloaliphatic reaction product.

35. An acrylic copolymer of claim 10, characterized in that said polycycloaliphatic compound which has a refractive index at 20° C. of at least 1.480 is present in an amount of at least 50% by weight in the carboxyl group-containing polycycloaliphatic reaction product.

36. An acrylic copolymer of claim 14, characterized in that the aromatic carboxylic acid is selected from the group consisting of naphthoic acids, benzenemonocarboxylic acids, and aromatic heterocyclic monocarboxylic acids.

37. An acrylic copolymer of claim 36, characterized in that the benzenemonocarboxylic acid is selected from the group consisting of benzoic acid, o-toluic acid, m-toluic acid, p-toluic acid, and tert.-butylbenzoic acid.

38. An acrylic copolymer of claim 36, characterized in that the aromatic heterocyclic monocarboxylic acid is selected from the group consisting of pyridine carboxylic acids and furancarboxylic acids.

39. An acrylic copolymer of claim 17, characterized in that said lactone is $\epsilon$-caprolactam.

40. An acrylic copolymer of claim 18 characterized in that the rheology adjuvant is an acrylic polymer modified with sagging control agents.

41. An acrylic copolymer of claim 18 characterized in that the light stabilizer is selected from the group consisting of UV absorbers and hindered amine light stabilizing compounds.

* * * * *